US009237286B2

(12) United States Patent
Theuwissen

(10) Patent No.: US 9,237,286 B2
(45) Date of Patent: Jan. 12, 2016

(54) IMAGE SENSOR AND METHOD FOR POWER EFFICIENT READOUT OF SUB-PICTURE

(71) Applicant: Albert Theuwissen, Bree (BE)

(72) Inventor: Albert Theuwissen, Bree (BE)

(73) Assignee: Harvest Imaging bvba (BE)

( * ) Notice: Subject to any disclaimer, the term of this patent is extended or adjusted under 35 U.S.C. 154(b) by 296 days.

(21) Appl. No.: 13/895,402

(22) Filed: May 16, 2013

(65) Prior Publication Data

US 2013/0308031 A1    Nov. 21, 2013

(30) Foreign Application Priority Data

May 16, 2012    (EP) .................................... 12168326

(51) Int. Cl.
*H04N 5/374* (2011.01)
*H04N 5/3745* (2011.01)
*H04N 5/345* (2011.01)
*H04N 5/378* (2011.01)

(52) U.S. Cl.
CPC ......... *H04N 5/37455* (2013.01); *H04N 5/3454* (2013.01); *H04N 5/378* (2013.01); *H04N 5/3742* (2013.01)

(58) Field of Classification Search
CPC ....... H04N 5/367; H04N 5/378; H04N 5/335; H04N 5/3658; H04N 5/347; H04N 5/3458; H04N 5/357; H04N 2101/00; H04N 5/37455; H04N 5/3454; H04N 5/3742; G06T 3/4015; G06T 5/002; G06T 7/408; G06T 2207/20182; G06T 2207/10004
See application file for complete search history.

(56) References Cited

U.S. PATENT DOCUMENTS

| | | | |
|---|---|---|---|
| 2002/0015098 A1* | 2/2002 | Hijishiri et al. | 348/207 |
| 2003/0155483 A1* | 8/2003 | Yokomichi et al. | 250/208.1 |
| 2003/0183850 A1* | 10/2003 | Pain et al. | 257/200 |
| 2005/0145777 A1* | 7/2005 | Barna et al. | 250/208.1 |
| 2006/0125940 A1* | 6/2006 | Tinkler et al. | 348/294 |
| 2006/0231732 A1 | 10/2006 | Yan | |
| 2008/0079832 A1 | 4/2008 | Chou | |
| 2009/0040349 A1 | 2/2009 | Xu | |
| 2010/0182473 A1* | 7/2010 | Nakamura | 348/308 |
| 2010/0271526 A1 | 10/2010 | Okuzaki | |

OTHER PUBLICATIONS

European Search Report and Written Opinion in EP 12168326.2, dated Jul. 20, 2012.

* cited by examiner

*Primary Examiner* — Roberto Velez
*Assistant Examiner* — Tuan Le
(74) *Attorney, Agent, or Firm* — Barnes & Thornburg LLP

(57) ABSTRACT

An image sensor (1) comprising: an array (2) of pixels logically organized in rows and columns, the outputs of the pixels being connected to column lines (COLx) connectable to an array of buffers (3) via a routing block (10), the buffers being connected to an array of A/D convertors (4), the routing block (10) having a group of switches (6, 7) for reading sub-picture data, whereby the values of at least two rows of the sub-picture are distributed over the analog-to-digital-convertors before digitizing them in parallel. The entire sub-picture (21) may be digitized in one step. The routing block (10) may comprise an analog bus (9). The image sensor (1) further comprises a control circuit (8) for controlling the routing block (10) for routing pixel values on the column lines (COL) to a subset of the buffer array, the control circuit being adapted for supporting sub-pictures (21) with programmable positions and/or sizes.

19 Claims, 12 Drawing Sheets

IMAGE SENSOR AND METHOD FOR POWER EFFICIENT READOUT OF SUB-PICTURE

FIELD OF THE INVENTION

The present invention relates to an image sensor, more in particular to an image sensor of the type having a column-level ADC architecture, and with means for reading a sub-picture of such image sensor. The invention also relates to a method for reading such a sub-picture.

BACKGROUND OF THE INVENTION

Image sensors are known in the art. They typically comprise a rectangular pixel array for converting light intensity into voltages, which are digitized for providing digital image data.

In several applications the image sensor needs to read certain pre-defined windows or sub-pictures, also called "Region-of-Interest" (ROI). Examples of such applications are machine vision applications and digital still applications. Especially in the case of high resolution devices (e.g. 4000×2000 pixels) in combination with a low resolution ROI (e.g. 100×100 pixels), the readout of the sub-picture may not be optimal. High-resolution devices very often have high-speed circuitry to maintain an acceptable frame rate (e.g. 10 frames/sec). This may realized by means of a column-level ADC configuration. FIG. 1 shows a block-diagram of an example of a prior art two-dimensional image sensor with 16 columns and 9 rows. The image sensor has an on-chip column-level ADC configuration. Every (analog) column is connected to a sample-and-hold circuit (buffer S&H) and to an analog-to-digital converter (ADC). The normal read-out of the sensor is driven by the row select (RS) lines. Although the column-level ADC architecture is very effective for full-resolution high-speed applications, it has some disadvantages in terms of speed and power consumption when only a Region-Of-Interest (or sub-picture) needs to be read out.

US2009/0040349 discloses methods, apparatuses and systems providing a high dynamic range mode of operation for an image sensor when operating in a skip mode where certain pixels of an array are not read out. Multiple integration periods are employed in the skip mode with selected pixels being read out through circuits associated with pixels that are not read out.

SUMMARY OF THE INVENTION

It is an object of embodiments of the present invention to provide an image sensor that allows an efficient readout of a sub-picture (also known as "region of interest"), and a method for reading the sub-picture data more efficiently.

The above objective is accomplished by a method and device according to embodiments of the present invention.

In a first aspect, the present invention provides an image sensor comprising:
- a pixel array comprising a plurality of image pixels logically organized in rows and columns, the outputs of the pixels of each column of the pixel array being connected to a corresponding column line;
- a buffer array comprising a plurality of buffers for each temporarily storing an analog value present on a column line; and
- an analog-to-digital convertor array comprising a plurality of analog-to-digital convertors operably connected to the buffers for converting the analog values stored in the buffers into digital values.

The image sensor further comprises a routing block connectable between the column lines and the buffer inputs. The routing block comprises a group of connection means, e.g. switching devices, for selectively operatively connecting at least one column line to at least two buffers for allowing readout of the pixel values of at least a first and a second selected row of a sub-picture of the pixel array, and storage of the pixel values in at least a first and a second subset of the buffer array, for allowing parallel, e.g. simultaneous, analog-to-digital-conversion of pixel values of the at least first and second rows of the sub-picture when activating the analog-to-digital convertor array.

The image sensor also comprises a control circuit for controlling the routing block for routing pixel values on the column lines to a subset of the buffer array. The control circuit is adapted for supporting sub-pictures with programmable positions and/or sizes.

Typically the sub-images to be read out are so-called regions of interest (also known as ROI or window), i.e. regions of the complete image where the image information at that particular moment in time is more relevant for some reason than in other regions of the image. An image sensor according to embodiments of the present invention allows to read out regions of interest which are not fixed at design time, for instance user definable regions of interest, or regions of interest proposed by a processing device associated with the image sensor.

In embodiments of the present invention, the number of analog-to-digital converters may be equal to the number of columns. This is, however, not required: there may be more columns than analog-to-digital converters, so that particular analog-to-digital converters are share by a plurality of columns.

While sensors of the prior art are capable of reading an entire (i.e. full resolution) image, some of them are capable of reading also a sub-picture. Reading the sub-picture in existing imagers is implemented by reading (and digitizing) only the relevant lines of the sub-picture, and sending out the relevant digital data, while skipping the reading of the irrelevant lines. However, internally, entire rows of pixels of the image sensor are read out and digitized, i.e. all digital-to-analog convertors are activated for reading out every single line of the ROI. This consumes a lot of time, and a lot of power.

In an image sensor according to embodiments of the present invention a sub-picture can also be read. Like in the prior art, the irrelevant lines are skipped, and only the relevant lines of the sub-picture are (consecutively) read. But in contrast to the prior art, not all the values on the columns of the pixel array are stored in the buffers. Instead, only the columns containing data values relating to pixels of the sub-picture are stored and distributed over the different buffers, line per line, and only when all (or most) of the buffers contain relevant pixel values, the array of analog-to-digital convertors is activated for digitizing in a single conversion step the pixel values of the two or more lines simultaneously.

Since the analog-to-digital convertors consume most of the power (e.g. 90%) and since the analog-to-digital conversion consumes a considerable fraction of the time needed for reading out a frame (e.g. 75%), it is clear that by reading the sub-picture with a reduced number of ADC-conversions as in accordance with embodiments of the present invention, both the time and the power consumption can be reduced.

An image sensor according to embodiments of the present invention may further comprise a further group of connection means, e.g. switches, for connecting each column line of the pixel array to a corresponding buffer input for allowing readout of the pixel values of all the pixels of a selected row of the pixel array, and storage of the pixel values in the buffer array for allowing analog-to-digital-conversion of the pixel values of a complete row of pixels when activating the analog-to-digital convertor array.

In "full-resolution mode" the entire image taken by the image sensor may be read (e.g. 4000×2000 pixels) line per line, in a manner quite similar to that of the prior art. In this mode the connection means, e.g. switches, of the further group (also called "bypass-switches") are closed, and the connection means, e.g. switches, for selectively operatively connecting at least one column line to at least two buffers are opened, so that each column of the image sensor is connected to one buffer and one ADC, as in the prior art.

In an image sensor according to embodiments of the present invention, the routing block may comprise an analog bus having a plurality of bus lines; and the group of connection means, e.g. switches, may comprise a first subset of connection means, e.g. switches, for operatively connecting the column lines of the sub-picture to the analog bus lines of the analog bus, and at least a second and a third subset of connection means, e.g. switches, for operatively connecting the analog bus lines to the at least first and second subsets of the buffer array.

An analog bus and switches is an elegant, practical, and manageable solution in an integrated chip, for implementing a plurality of analog 1-to-N demultiplexers between the column lines to the buffers. It also simplifies design, in particular, routing and timing-simulation.

In an image sensor according to embodiments of the present invention, the width of the sub-picture may be an integer multiple of the number of analog bus lines. The "width of the sub-picture" is hereby defined as the number of column lines required for reading the sub-picture. For a rectangular sub-picture this is equal to the number of pixels on any line of the sub-picture. For an irregular sub-picture, the width of the sub-picture is equal to the number of pixels on the largest line of the sub-picture. Choosing the width of the sub-picture an integer number (larger than one) times the number of analog bus lines, allows the number of bus lines to be smaller than the required number of column lines for reading the sub-picture. In this way circuit space (e.g. silicon area) can be reduced, while the number of row-accesses for reading the sub-picture data can also be reduced, thus time and power may be reduced for a given analog-bus-width. At the same time design-complexity may also be reduced.

In particular embodiments, the width of the sub-picture may be equal to the number of analog bus lines. When the width of the sub-picture is chosen equal to the number of analog bus lines, each row of the sub-picture can be stored in the buffers by a single row-access. This reduces the number of row-accesses to a minimum, and avoids that a row needs to be accessed twice, thus saving time.

In embodiments of the present invention, the total number of pixels of the sub-picture may be an integer multiple of the number of analog-digital-convertors. This allows the entire sub-picture to be digitized in only N (the integer multiple) activations of the analog-to-digital convertor, thus reducing the power consumption.

In particular embodiments, the total number of pixels of the sub-picture may be equal to the number of analog-digital-convertors. In this special case, the entire sub-picture can be digitized in a single activation of the analog-to-digital convertor, thus further reducing the power consumption.

In an image sensor according to embodiments of the present invention, the sub-picture may be rectangular. A rectangular sub-picture is easier to implement and optimize than irregularly shaped sub-pictures, because each row of the sub-picture has the same number of pixels, and during each row access, a same amount of sub-pixel data would be read and stored in the buffers. However, a rectangular shape is not absolutely required.

In an image sensor according to embodiments of the present invention, the sub-picture may have a programmable vertical position and/or a programmable horizontal position. The architecture of the image sensor according to embodiments of the present invention is very much suited for allowing programmable vertical and/or horizontal positions of the sub-picture in the image. This considerably increases the flexibility of the image sensor. It is to be noted that this principle also works for non-rectangular sub-pictures, although rectangular sub-pictures are easier to implement.

In an image sensor according to embodiments of the present invention, the sub-picture may have a predefined horizontal position or a predefined vertical position (in combination with a programmable vertical position or a programmable horizontal position, respectively). This may simplify the design and verification, chip area, and control interface.

In particular embodiments, the sub-picture may have a vertical symmetry-axis, which may be for example be located substantially in the middle of the pixel array. Such a location may be very suitable for zooming applications. A sub-picture having a vertical symmetry-axis which is not necessarily located substantially in the middle of the pixel array may be suitable for applications where object-tracking is important. The objects to be tracked are not necessarily present in the centre of the image. The application may e.g. alternate between the full-resolution mode for finding the object of interest, and once the object is found, go to "sub-picture"-mode for capturing only the region of interest at a higher speed and/or reduced power consumption.

In embodiments of the present invention, the image sensor may be a CMOS image sensor, and the first and second group of connection means, e.g. switches, may comprise NMOS transistors. An NMOS transistor has a very small footprint, can be controlled (opened or closed) by means of a single control line, and is ideally suited to be used as an analog switch for this application. Ideally a combination of an NMOS transistor and a PMOS transistor are used in the connection means, e.g. switches, forming a so-called pass-gate.

An image sensor according to embodiments of the present invention may furthermore comprise control logic for controlling the group of connection means, e.g. switches, for selectively operatively connecting at least one column line to at least two buffers and/or the further group of connection means, e.g. switches, for connecting each column line of the pixel array to a corresponding buffer input first and the second group of connection means, e.g. switches. Such control may be depending on a selected mode of operation, e.g. "full resolution mode" or "readout of ROI mode".

In a second aspect, the present invention provides a method for reading the image data of a sub-picture of an image sensor comprising an array of pixels logically organized in rows and columns, a buffer array comprising a plurality of buffers for each temporarily storing an analog value on a column line, and an analog-to-digital convertor array comprising a plurality of analog-to-digital convertors operably connected to the buffers for converting the analog values stored in the buffers into digital values. The method comprises obtaining non-predefined location specifications about the sub-picture to be read; based on the obtained location specification, routing at least image data of the pixels of a first row of the sub-picture to a first subset of the buffers, and image data of the pixels of a second row of the sub-picture to a second subset of the buffers; and thereafter, activating the analog-to-digital convertor array for performing parallel, e.g. simultaneous, analog-to-digital conversion of the pixel values of the at least first and second rows of the sub-picture.

In a method according to embodiments of the present invention, routing at least image data of pixels of a row of the sub-picture to the buffers may include routing the image data from a column to an analog bus line, and from the analog bus line to a buffer.

In a method according to embodiments of the present invention, obtaining non-predefined location specifications about the sub-picture to be read may include receiving location specifications about the sub-picture from a processor having analysed an image on the array of pixels.

Alternatively, obtaining non-predefined location specifications about the sub-picture to be read may include receiving user defined location specifications about the sub-picture to be read. Receiving user defined location specifications may comprise a user selecting the sub-picture to be read, for instance by moving a window on a touch screen, or by means of a button on a camera comprising the image sensor, which button is linked to device features adapted for selecting a sub-image out of a complete image.

In accordance with embodiments of the present invention, obtaining non-predefined location specifications about the sub-picture to be read may comprise receiving information about position and/or size, e.g. width and/or height, of the sub-picture.

A main advantage of a method according to embodiments of the present invention is to reduce the time and energy required for reading a sub-picture of an image sensor.

It is an advantage of embodiments of the present invention that an image sensor and a method for readout of sub-picture data are provided which increase the readout speed and/or reduce the power consumption when reading a sub-picture of the image sensor.

Particular and preferred aspects of the invention are set out in the accompanying independent and dependent claims. Features from the dependent claims may be combined with features of the independent claims and with features of other dependent claims as appropriate and not merely as explicitly set out in the claims.

These and other aspects of the invention will be apparent from and elucidated with reference to the embodiment(s) described hereinafter.

Figure 1:
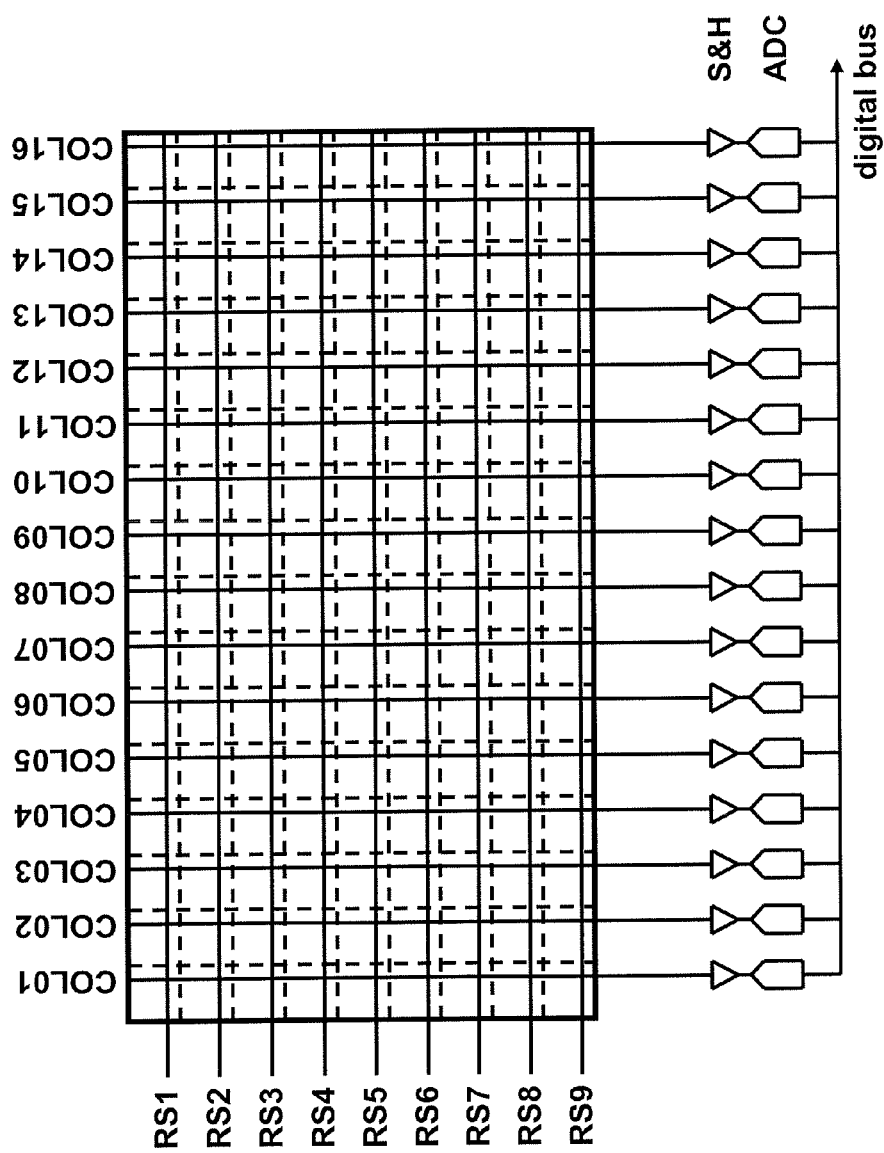
FIG. 1 schematically shows an example of a two-dimensional image sensor with 16 columns and 9 rows as known in the art. The image sensor has an on-chip column-level ADC architecture.

The drawings are only schematic and are non-limiting. In the drawings, the size of some of the elements may be exaggerated and not drawn on scale for illustrative purposes.

Any reference signs in the claims shall not be construed as limiting the scope.

In the different drawings, the same reference signs refer to the same or analogous elements.

DETAILED DESCRIPTION OF ILLUSTRATIVE EMBODIMENTS

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. The dimensions and the relative dimensions do not correspond to actual reductions to practice of the invention.

Furthermore, the terms first, second and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein.

Moreover, the terms top, under and the like in the description and the claims are used for descriptive purposes and not necessarily for describing relative positions. It is to be understood that the terms so used are interchangeable under appropriate circumstances and that the embodiments of the invention described herein are capable of operation in other orientations than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

It should be noted that the use of particular terminology when describing certain features or aspects of the invention should not be taken to imply that the terminology is being re-defined herein to be restricted to include any specific characteristics of the features or aspects of the invention with which that terminology is associated.

Where in embodiments of the present invention reference is made to an image sensor, reference is made to a device which converts radiation, for example visible light, to a signal or plurality of signals, e.g. by photoelectric conversion, in order to encode a spatial distribution of a property of this radiation, e.g. intensity, as function of location on an imaging plane of the image sensor. Such image sensor may typically comprise a plurality of pixel elements, e.g. arranged in an array, for determining this property of the radiation at a plurality of locations. For example, an image sensor may comprise a charged coupled device (CCD), which accumulates a small electrical charge in a pixel element when light impinges on this element. These accumulated charges may be converted to a voltage during a read-out phase, e.g. in which all pixel elements are read out sequentially. Additional circuitry may be provided to further encode these voltage levels into digital information. In another example, an image sensor may comprise a complementary metal oxide semiconductor (CMOS) imaging chip, a type of active pixel sensor made using the CMOS semiconductor process. In a CMOS imaging sensor, each pixel element, e.g. photosensor, is provided with integrated semiconductor circuitry, e.g. in the immediate vicinity of the pixel element, to convert the light energy received by the pixel element to a voltage for read-out. This reduces the electrical path length between the pixel element and read-out circuitry compared to a CCD sensor, but increases the manufacturing complexity.

Embodiments of the present invention relate to an image sensor, for example but not limited to a CMOS imager, comprising an array of pixels for detecting radiation. Typically, in such array the pixels are organized in the array in rows and columns. The terms "column" and "row" are used to describe sets of array elements which are linked together. The linking can be in the form of a Cartesian array of rows and columns, however, the present invention is not limited thereto. Also non-Cartesian arrays may be constructed and are included within the scope of the invention. Accordingly the terms "row" and "column" should be interpreted widely. To facilitate in this wide interpretation, reference may be made to "logically organised rows and columns". For example, the rows may be circles and the columns radii of these circles and the circles and radii are described in this invention as "logically organised" rows and columns. By this is meant that sets of pixels are linked together in a topologically linear intersecting manner; however, that the physical or topographical arrangement need not be so. Throughout this description, the terms "horizontal" and "vertical" (related to the terms "row" and "column", respectively) are used to provide a co-ordinate system and for ease of explanation only. They do not need to, but may, refer to an actual physical direction of the device.

As will be understood by those skilled in the art, columns and rows can be easily interchanged and it is intended in this disclosure that these terms be interchangeable. Irrespective of its physical direction, a "column" is meant to indicate a first direction in an array of pixels, for example along which neighbouring pixels are arranged which are typically read out in subsequent scan operations. A "row" indicates a second direction along which neighbouring pixels are arranged which are for example typically read out simultaneously. Row direction and column direction are different directions, for example orthogonal directions.

In the present application, the terms "lines" and "rows" are used as synonyms, unless otherwise noted.

Where in embodiments of the present invention reference is made to a "pixel", reference is made to a location of the image sensor, capable of encoding a property of impinging radiation. Where in embodiments of the present invention reference is made to an "image pixel", reference is made to a location of the image sensor capable of providing image information of an image to be taken.

In the description provided herein, numerous specific details are set forth. However, it is understood that embodiments of the invention may be practiced without these specific details. In other instances, well-known methods, structures and techniques have not been shown in detail in order not to obscure an understanding of this description.

Figure 2:
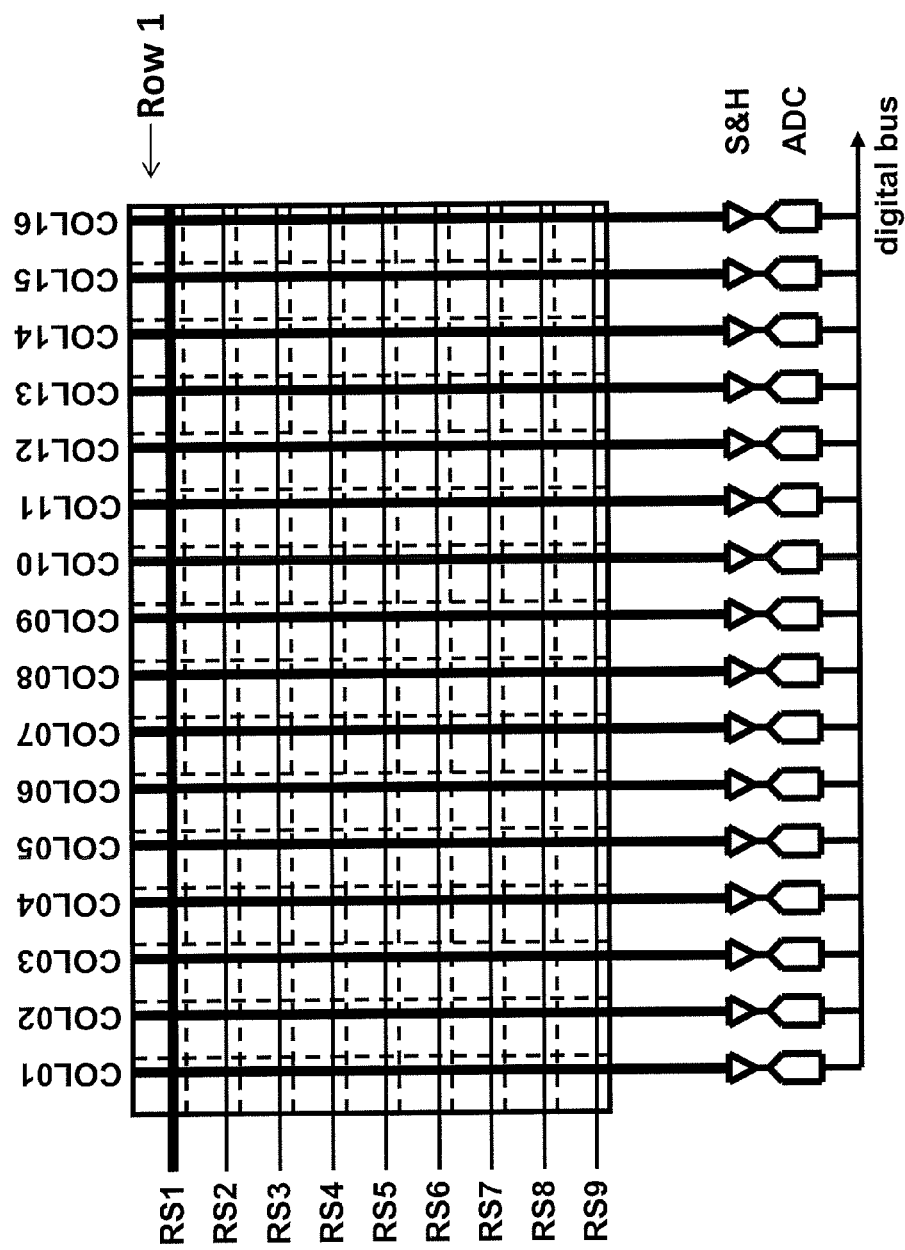
FIG. 2 schematically shows how the first row of pixels of the prior art image sensor of FIG. 1 is read, when reading a full-resolution image.

Before describing an image sensor 1 according to embodiments of the present invention, first is described in more detail how a full-resolution picture and a sub-picture 21 are read in a prior art image sensor as for example illustrated in FIG. 1. FIG. 2 shows the image sensor of FIG. 1, whereby a first row select line RS1 is activated, schematically indicated by the thick line width (this convention will also be used in the other drawings). This causes the pixels of the first row Row1 to place their analog values on the corresponding column lines COL01 to COL16. Thus the pixel of row 1 and column 1 places its value on COL01, the pixel of row 1 and column 2 places its value on COL02, etc. Each of the column lines COL01 to COL16 is connected to a sample-and-hold buffer S&H for sampling and temporarily holding the analog value of the column line. The output of each of the sample-and-hold buffers is connected to an analog-to-digital convertor (abbreviated as A/D or ADC) for converting each analog value into a corresponding digital value. The digital values are then read out sequentially over a digital bus, e.g. a 12-bit or 14-bit wide bus depending on the resolution of the ADC. A similar sequence (not shown) is repeated for each of the other rows, thus the image sensor is read-out sequentially line by line. As indicated by the thick lines, all sample and hold buffers and all the analog-to-digital convertors are active for each row (also called "line") being read.

Figure 3:
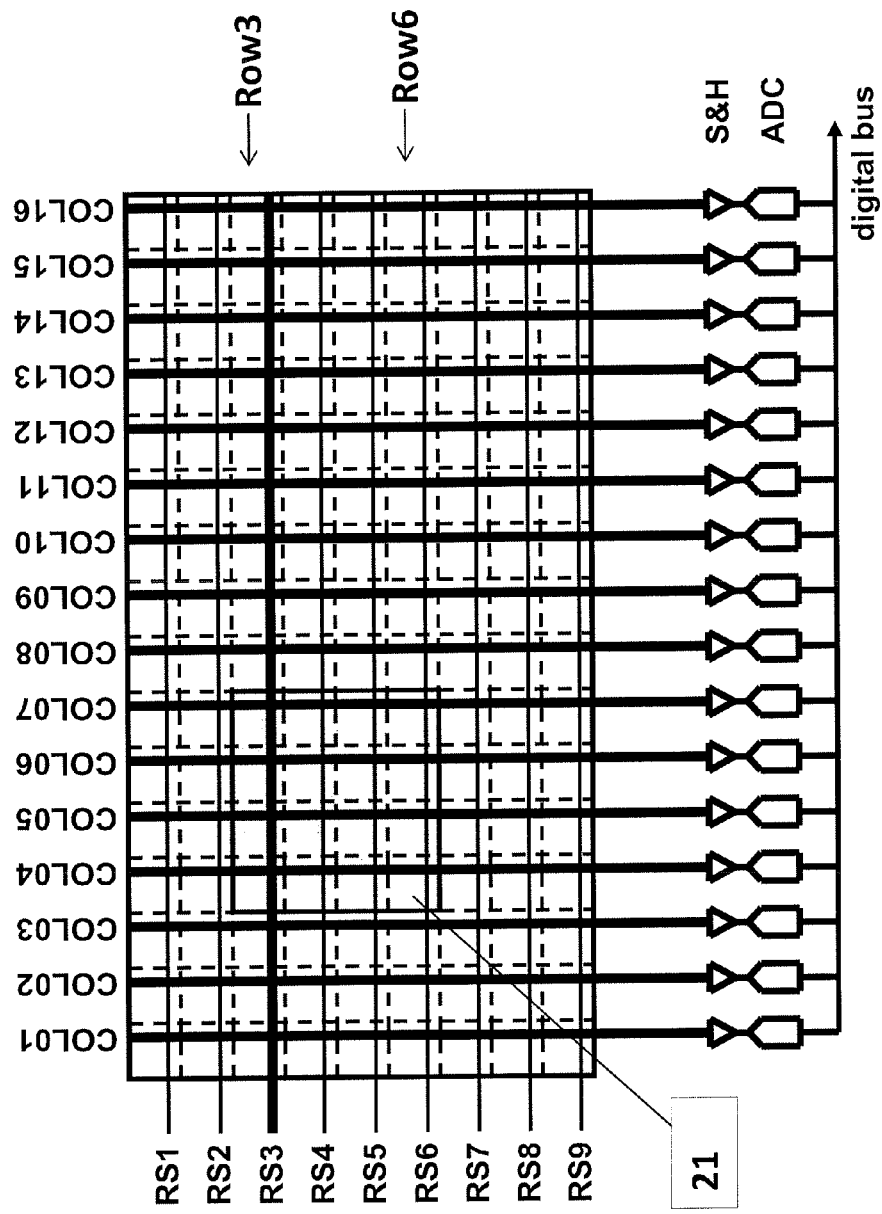
FIG. 3 schematically shows how the first row of pixels of a sub-picture is read in the prior art image sensor of FIG. 1.

The prior art image sensor of FIG. 1 also has the capability of reading at least one sub-picture area 21, also known as "Region Of Interest" (ROI). When supposing, by way of example, that there is one ROI having a fixed size of sixteen pixels (4×4=16) and fixed location as indicated in FIG. 3, with pixels located from row 3 to row 6, and from column 4 to column 7. FIG. 3 illustrates how the first row (i.e. the top row) of the sub-picture 21 (i.e. row 3 of the image sensor) is read in the prior art image sensor. Similar as for a full-resolution picture (see FIG. 2), the pixels of the sub-picture are read line by line, except that rows 1 and 2, and 7 to 9 (in the embodiment illustrated) are skipped. First the row-select line RS3 is activated (indicated by the thick line width), and this causes all pixels of the third row Row3 of the image sensor, not just those of the sub-picture 21, to place their analog value on one of the corresponding column lines COL01 to COL16. All the sample-and-hold buffers S&H are enabled for sampling and holding the data on the column lines, and all the analog-to-digital convertors ADC are activated for converting the analog values to digital values, and all the digital values are read-out over the digital bus. Then the next row select line RS4 of the sub-picture 21 is activated, and again all buffers and all A/D convertors are activated, and the digitized data is read out over the digital bus. This sequence is repeated up to the last row of the sub-picture, i.e. Row6 in this example. Although some time is gained by only reading the lines that correspond to the sub-picture 21 (i.e. by skipping, in the embodiment illustrated, the rows 1, 2, 7, 8 and 9), the read-out is still not optimal in terms of time and power required, because only the digital values of columns 4 to 7 are wanted, while the digital values of the other columns (i.e. columns 1 to 3 and columns 8 to 16) are to be discarded. Thus time and energy are wasted, which is especially important for image sensors having an ROI-size considerably smaller (e.g. a factor of 2 or 4 or 10 or 50 or even more smaller) than the total image size (e.g. ROI-size is 100×100 pixels and total image size is 4000×2000 pixels).

Figure 4:
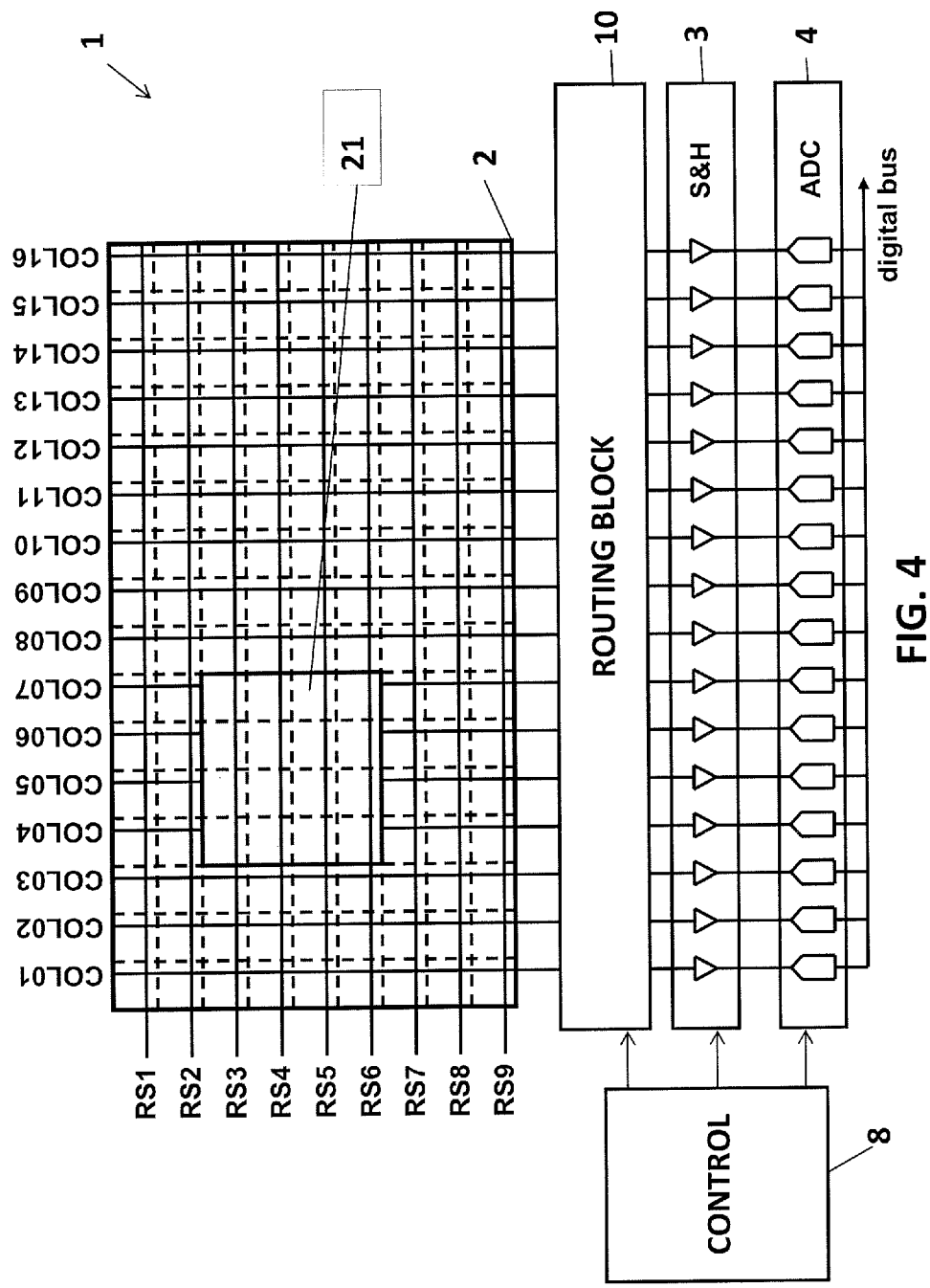
FIG. 4 schematically illustrates an embodiment of an image sensor according to the present invention, with a routing block located between the pixel array and an array of buffers.

An image sensor 1 according to embodiments of the present invention has an architecture as illustrated in the exemplary illustration of FIG. 4. When comparing the architecture of FIG. 4 with the prior art architecture of FIG. 1, it is immediately clear that the main difference lies in the addition of a routing block 10. How this architecture increases the efficiency of the readout will be described next. An image sensor 1 according to embodiments of the present invention furthermore comprises a control circuit 8 for controlling a.o. the routing block 10 for routing pixel values on the column lines to a subset of the buffer array. The control circuit 8 is adapted for supporting sub-pictures with programmable positions and/or sizes, e.g. widths and/or heights.

The image sensor 1 according to embodiments of the present invention has two modes of operation: a first mode for reading the full-resolution picture, i.e. for reading out the values of all pixels in the pixel array, and a second mode for reading substantially solely the sub-picture 21 in a more efficient way than the prior art. In the full-resolution mode, the principle of operation is quite similar to that of the prior art image sensor, in that all rows of the image sensor 1 are read sequentially, line by line, and all pixel values are stored on a corresponding column-line, buffered, A/D converted, and sent out via the digital bus. The reading of the sub-picture 21 in accordance with embodiments of the present invention, however, is quite different.

In accordance with embodiments of the present invention, the sub-picture has a programmable position and/or size. A programmable position means that the pixels forming part of the sub-picture are not defined as such in beforehand, e.g. during design time, but are defined as such during use of the imaging device. A programmable size means that the width and/or the height of the sub-picture are not defined as such in beforehand, e.g. during design time, but are defined during use of the imaging device.

In accordance with embodiments of the present invention, a sub-picture could for instance have a fixed position of one of its characteristic points, for instance a corner of a corresponding region-of-interest. As an example only, e.g. a pixel of the sub-picture corresponding to the left top corner of the region-of-interest could be fixed, the region-of-interest and hence the sub-picture, however, not having a predetermined or fixed size (width and/or height), hence at least one other characteristic point of the sub-picture, for instance the right bottom corner of the corresponding region-of-interest, not being predefined.

When using an image sensor in accordance with embodiments of the present invention, in a first step, a region-of-interest may be defined or programmed. This may be done in various ways, for instance by user input, or in a more automated way.

One way to define a region-of-interest may be by having the image sensor, part of for instance a camera, look at a scene of interest. Nowadays, most often, an image of this scene is presented to the user on a screen, for instance a touch screen. On the camera, means may be provided for allowing the user to define the region-of-interest on the screen. Such means may for instance comprise features corresponding to touch and drag operations on the screen. For instance, a user may tap (simple soft touch with the tip of the finger) on the touch screen at or close to the centre of the region-of-interest to be defined. This location will form the centre of the region-of-interest. The user may then spread a region-of-interest around that centre, for instance by spreading at least two fingers. The region-of-interest may then correspondingly be formed around the centre previously defined by tapping on the screen, in a predetermined shape, for instance a rectangle. Features may be provided to drag the region-of-interest over the touch screen, so as to place it at another location.

Alternatively, if no touch screen is available, similar actions may be performed by pushing relevant buttons which are programmed to obtain the same or a similar result.

Yet alternatively, a processor of the imaging device may propose itself a relevant region-of-interest, based on a first complete image being taken. For instance, the processor may analyse this complete image and may perform face recognition or subject tracking, and based thereon propose a region-of-interest which depends on the size and location of the recognized face or tracked subject. Even if the region-of-interest is proposed automatically, means may be provided for allowing a user to move the proposed region-of-interest over the image region.

The location and size of the region of interest forms location information for the sub-picture to be read: substantially only information from pixels falling within the region-of-interest will be read out in the second mode.

Figure 13:
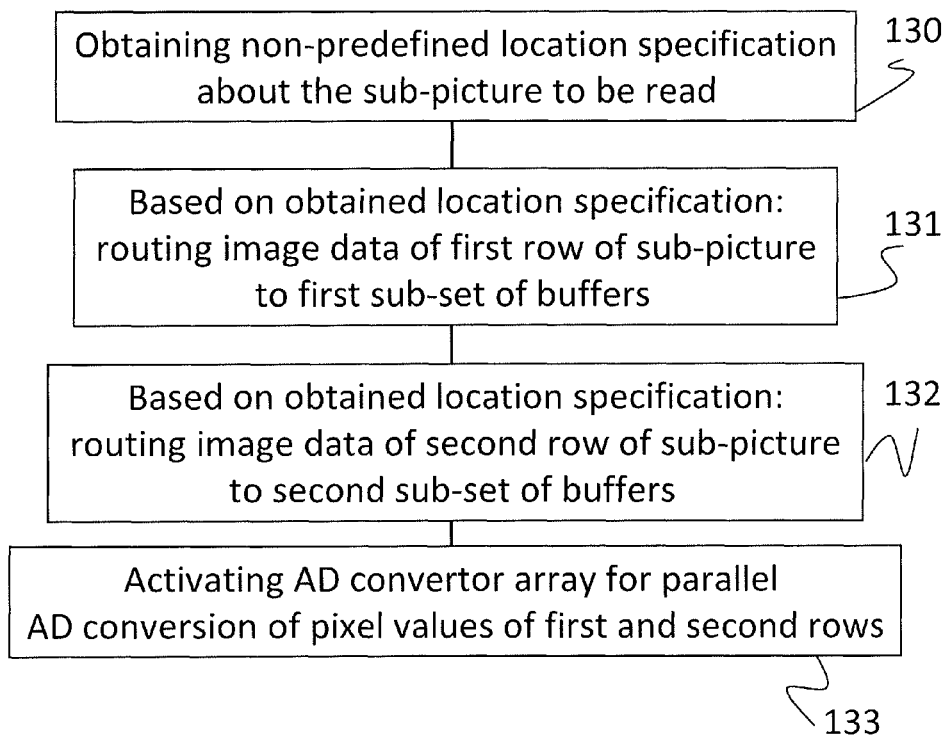
FIG. 13 is a flow chart illustrating a method according to embodiments of the present invention.

Once the region-of-interest is defined, pixels corresponding to a sub-picture corresponding to this region-of-interest may be determined. Corresponding location information may be provided, as illustrated as a first step 130 in the flow chart of FIG. 13. In accordance with embodiments of the present invention, the control circuit is adapted hereto, and may be programmed to make a link between the defined region of interest and the particular image pixels of which a sub-picture is to be read.

Based on the thus obtained location information about the sub-picture, this sub-picture is then read as explained below with reference to the drawings.

Figure 5:
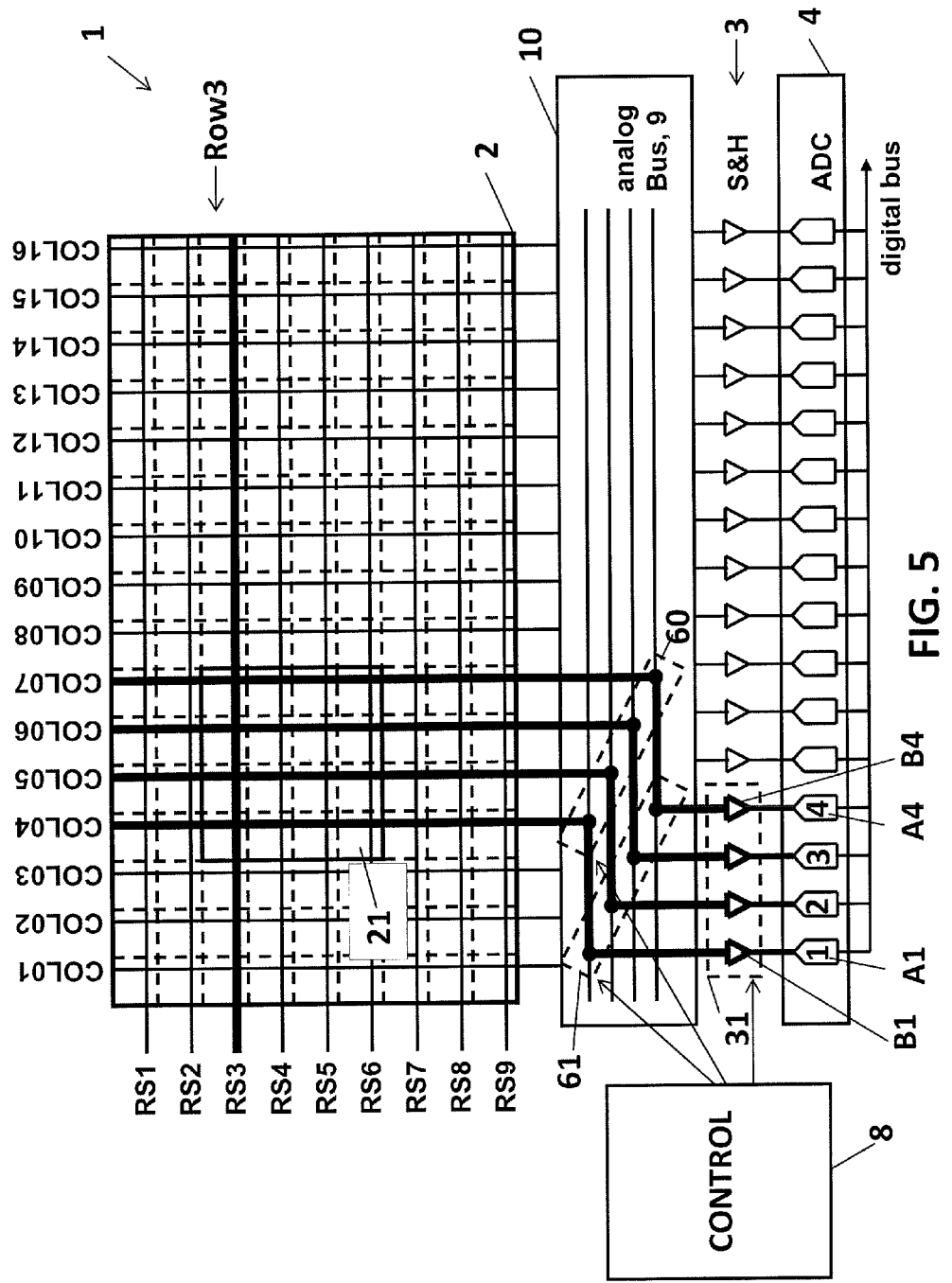
FIG. 5 schematically indicates how a first row of the sub-picture of the image sensor of FIG. 4 is stored in a first subset of the buffers.

FIG. 5 schematically illustrates how the pixels of the first row (e.g. the top row) of the sub-picture 21 of the image sensor 1 of FIG. 4, i.e. in the embodiment illustrated the relevant pixels on Row3, are read. This corresponds to the second step 131 in the flow chart of FIG. 13. The row-select line RS3 is activated. This causes the pixels of the third row Row3 of the pixel array 2 of the image sensor 1 to place their analog values on the corresponding column lines COL01 to COL16. The routing block 10 comprising circuitry for routing only the relevant columns of the sub-picture 21 (i.e. the pixels on COL04 to COL07 in this example) to the subset 31 of the buffer array 3, in the example illustrated consisting of four buffers B1 to B4. Without going into the details, the routing block 10 may have an analog bus 9, and several sets of connection means, e.g. switches 60, 61 for achieving this routing. The analog pixel values may be temporarily stored in the buffers B1 to B4 for A/D conversion later. In contrast to the prior art image sensor, in accordance with embodiments of the present invention the A/D convertors are not activated yet, thus time and energy are saved, since A/D conversion is quite time and energy consuming.

Figure 7:
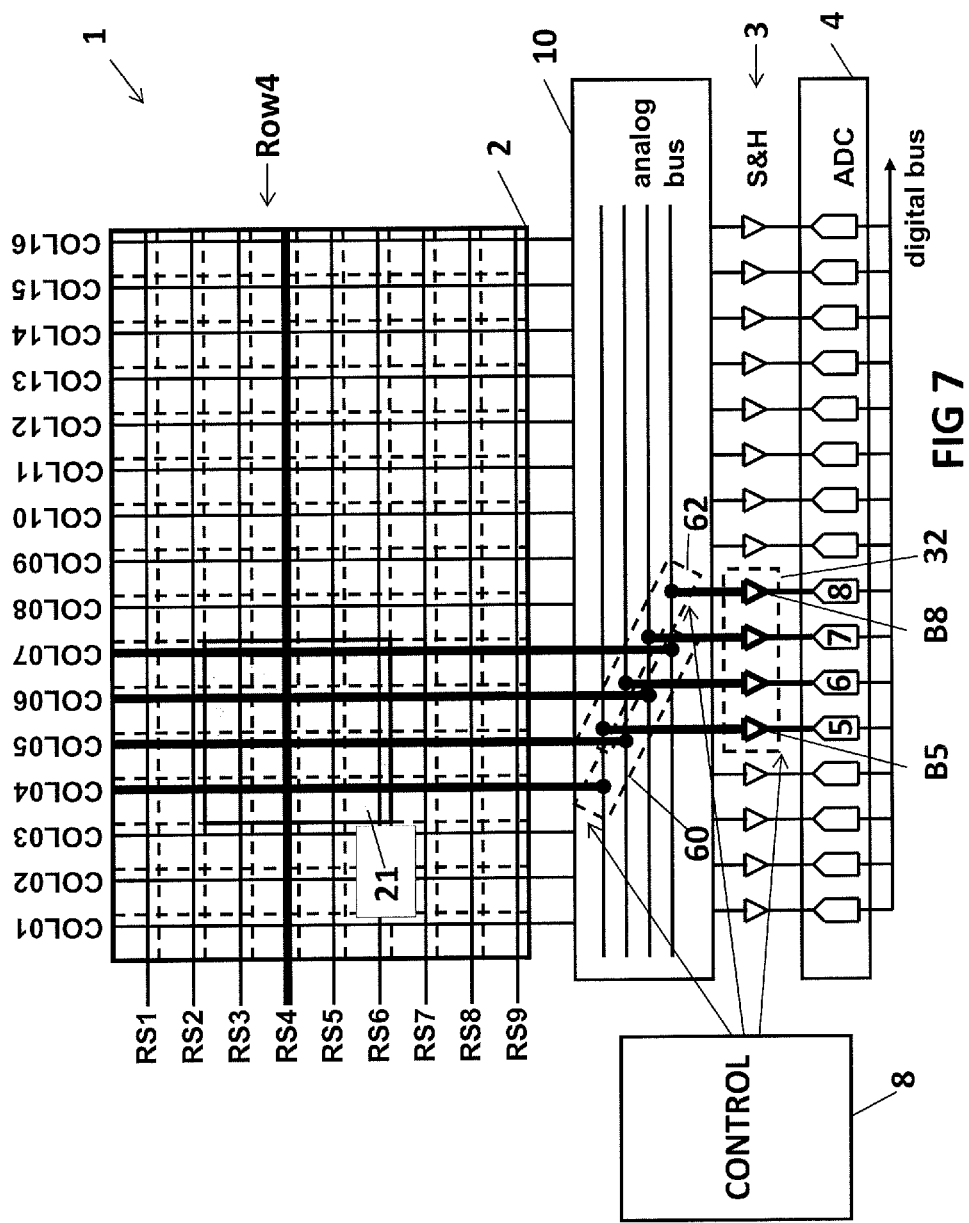
FIG. 7 schematically indicates how a second row of the sub-picture of the image sensor of FIG. 4 is stored in a second subset of the buffers.

FIG. 7 shows how the second row of the sub-picture 21, e.g. in the embodiment illustrated Row4 of the pixel array 2, is read by activating the corresponding row selector RS4; how the control circuit 8 controls the routing block 10 for routing the pixel values on the columns COL04 to COL07 to a second subset 32 of the buffer array 3, in the example illustrated consisting of B5 to B8; and how the control circuit 8 controls the sample and hold buffers 3, for maintaining the values that were stored in the first buffer partition 31, and for storing and holding the new data in the second buffer partition 32 for A/D conversion later. This corresponds to the third step 132 in the flow chart of FIG. 13.

Figure 8:
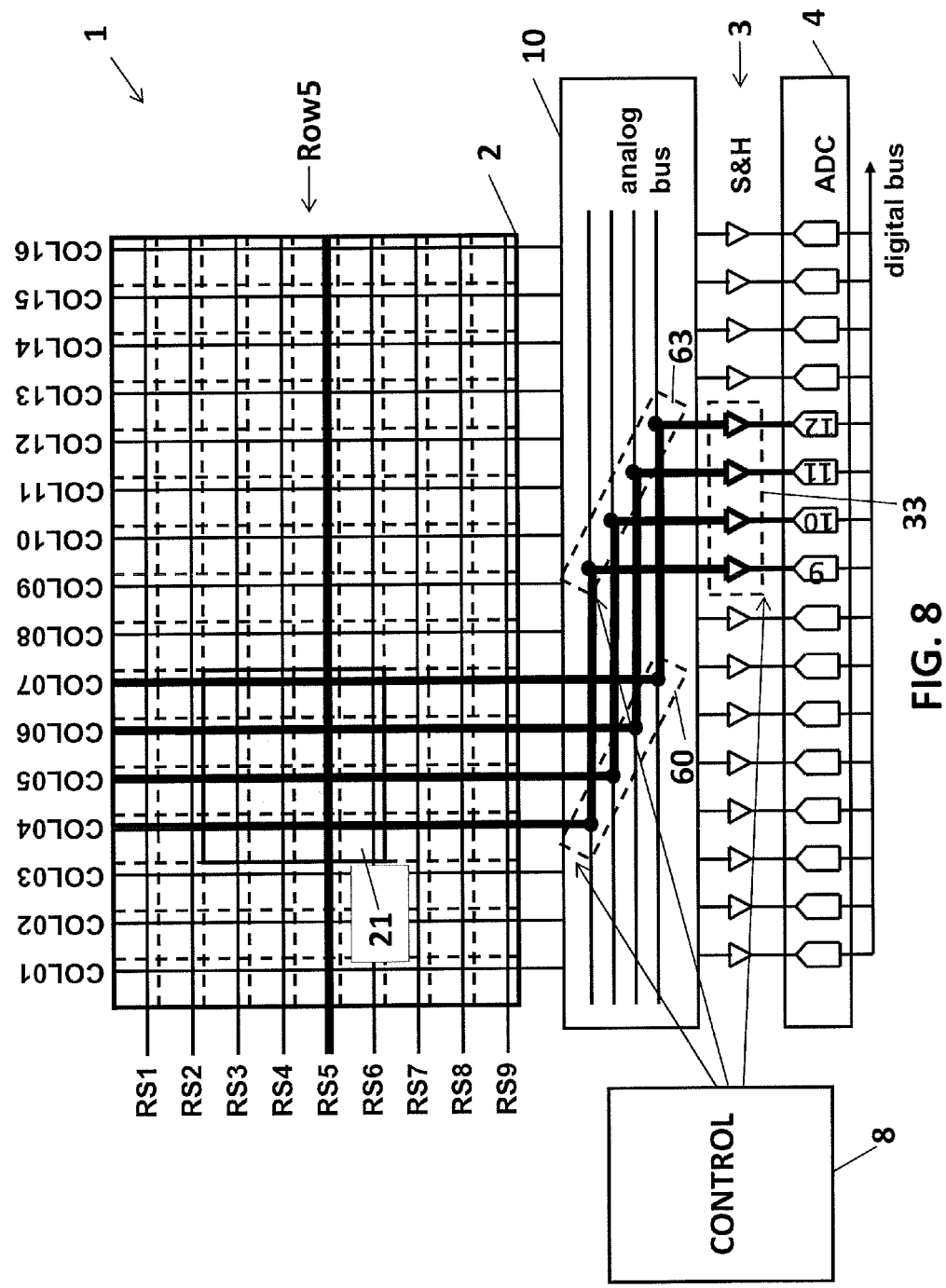
FIG. 8 schematically indicates how a third row of the sub-picture of the image sensor of FIG. 4 is stored in a third subset of the buffers.

FIG. 8 shows in a similar way how the third row of the sub-picture 21, i.e. in the embodiment illustrated Row5 of the pixel array 2, is read, by activating the corresponding row selector RS5; how the control circuit 8 controls the routing block 10 for routing the pixel values on the column lines COL04 to COL07 to a third subset 33 of the buffer array 3, in the example consisting of B9 to B12; and how the control circuit 8 controls the buffer array 3 for maintaining the data in the first and second subset 31, 32, and for storing and holding the new data in a third subset 33 of the buffer array 3, for A/D conversion later.

Figure 9:
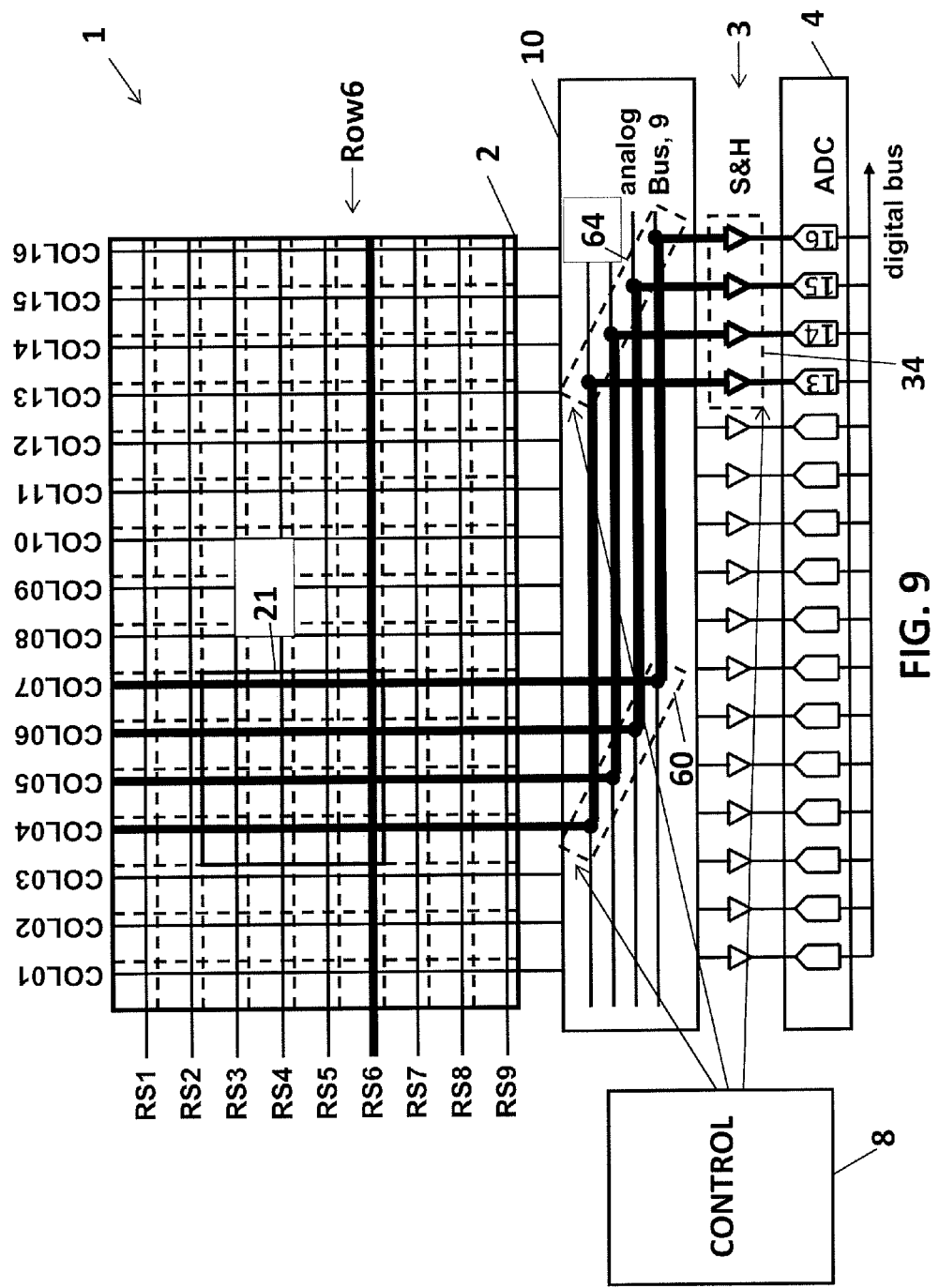
FIG. 9 schematically indicates how a fourth row of the sub-picture of the image sensor of FIG. 4 is stored in a fourth subset of the buffers.

FIG. 9 shows in a similar way how the fourth row of the sub-picture 21, i.e. in the embodiment illustrated Row6 of the pixel array 2, is read, by activating the corresponding row selector RS6; how the control circuit 8 controls the routing block 10 for routing the pixel values on the column lines COL04 to COL07 to a fourth subset 34 of the buffer array 3, in the example illustrated consisting of B13 to B16; and how the control circuit 8 controls the buffer array 3 for maintaining the data in the first and second and third subset 31, 32, 33 of the buffer array 3, and for storing and holding the new data in the fourth subset 34 of the buffer array 3, for A/D conversion later.

Finally, when a plurality of, e.g. substantially all or even all, buffers of the buffer array 3 hold a value of the sub-picture 21, a single A/D conversion is performed by the array of analog-to-digital-convertors 4. This corresponds to the fourth step 133 in the flow chart of FIG. 13. Compared to the prior art, only a single A/D conversion is required instead of (for the example illustrated) four A/D conversions. Thus, in this example, the time and energy of three A/D-conversions is saved. In addition, the time required for reading out and discarding unnecessary data over the digital bus is saved as well, since only relevant pixel data is placed on the digital bus. This may save further energy in external circuitry, e.g. a processor, or a memory.

From the description above, it is clear that by providing the routing block 10 and corresponding control means in control block 8 for controlling the routing block 10, in particular for example connection means, e.g. switches, thereof, the image sensor 1 of embodiments of the present invention needs less time and energy for reading and converting the pixels of the sub-picture 21 than the standard method of addressing the sub-picture line by line, and converting the analog information of all columns into the digital domain line by line as well. Furthermore, it is an advantage of the read-out method according to embodiments of the present invention that it is less sensitive to column fixed pattern noise than prior art methods.

In effect, the principle of embodiments of the present invention boils down to reading the sub-picture line by line, and distributing the analog values of the sub-picture over the available buffers, and then, when substantially all or all the buffers are filled, converting them all at once by the ADC block 4 (i.e. digitizing them).

In the example illustrated, the sub-picture has a dimension of 4×4 pixels, and the array 4 of ADC convertors comprises 16 ADC convertors. This, however, is not intended to be limiting for the present invention. The number of pixels in the sub-picture may be larger or smaller than the number of ADCs in the array 4 of ADCs. Hence, for reading out the sub-picture, the ADCs do not need to be all filled with data from the sub-picture pixels. Alternatively, in accordance with embodiments of the present invention, it is possible that more than one digitising operation may be required in the ADCs. However, in accordance with embodiments of the present invention, the number of ADC digitising operations will be lower than the number of rows in the sub-picture.

In the example illustrated, data from the last pixel of a particular row of the sub-picture, and from the first pixel of another row are put in adjacent ADCs in the array 4. This is also not intended to be limiting for the present invention. Intermediate ADCs may be left empty and not used for reading out the sub-picture.

Figure 6:
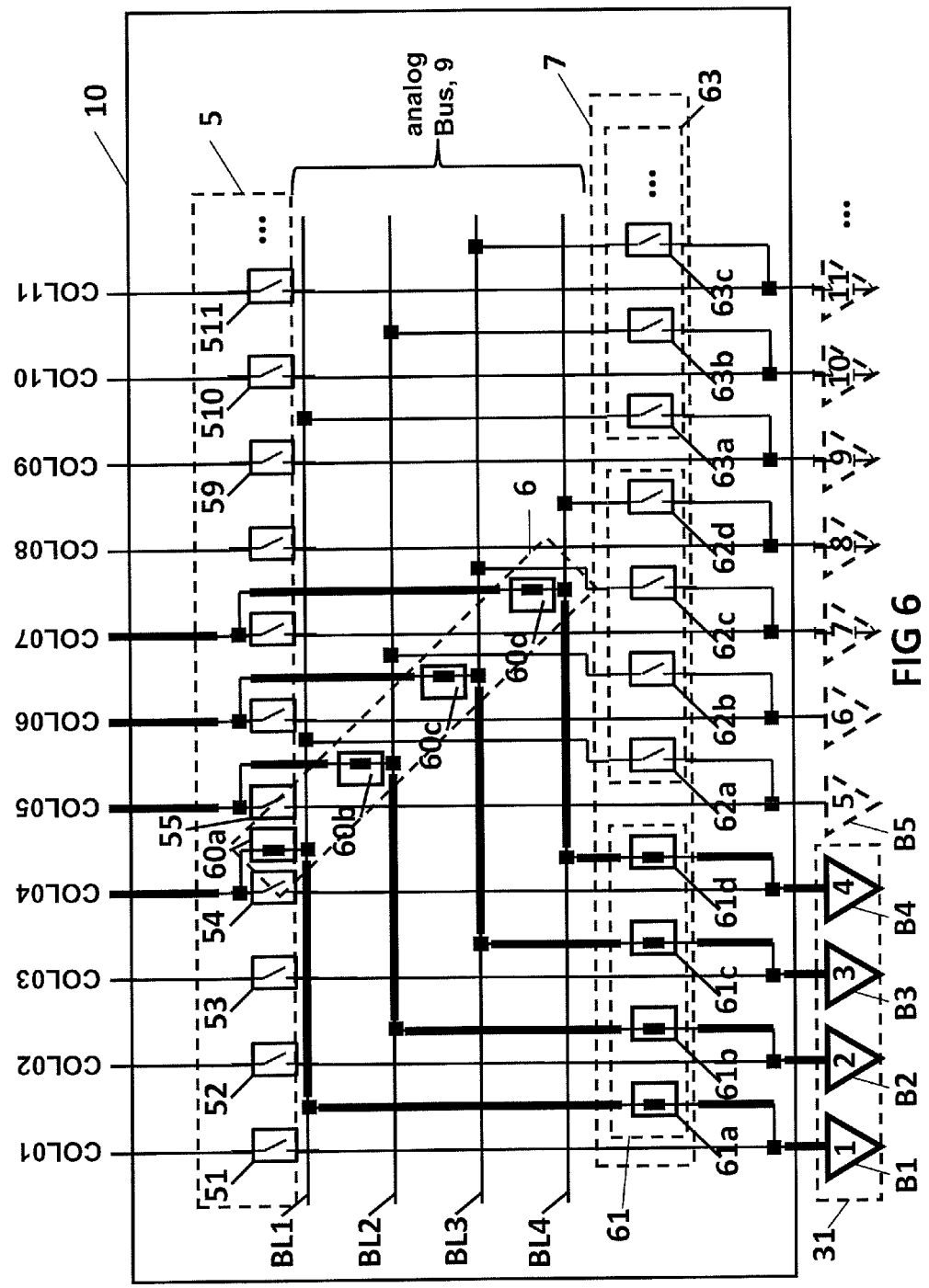
FIG. 6 shows a detailed embodiment of (part of) the routing block of the image sensor illustrated in FIG. 4.

FIG. 6 shows an exemplary detailed embodiment of (part of) the routing block 10. The routing block 10 comprises a first group 5 of connection means, e.g. switches 51, 52, 53, ..., 511 for connecting each column line COL01 to COL16 of the pixel array 2 of the image sensor 1 to one buffer input B1 to B16 for data transfer. In a first mode of operation, also called the "full-resolution-mode", all the switches 51, 52 to 516 of the first group 5 of switches are closed so as to provide a continuous data path, and the analog values on all the columns COL01 to COL16 are passed to the buffers B1 to B16 of the buffer array 3. This mode can be used for reading full-resolution pictures, line by line.

The routing block 10 also comprises an internal bus, e.g. an internal analog bus, comprising a plurality of bus lines BL1 to BL4. The number of bus lines may be, but does not need to be, equal to the number of lines in a region of interest. The number of bus lines may be different from, e.g. smaller or even larger, than the number of lines in a region of interest. The number of lines in a region of interest may for example be an integer multiple of the number of bus lines.

The routing block 10 furthermore comprises a second group 6 of connection means, e.g. switches 60*a*, 60*b*, 60*c*, 60*d*, for connecting each column line COL01 to COL16, or at least each column line pertaining to the at least one region of interest, to one of the bus lines BL1 to BL4, and a third group 7 of connection means, e.g. switches 61*a*, 61*b*, . . . , 61*d*, 62*a*, . . . 62*d*, 63*a*, . . . , 63*c* for connecting the buffers B1 to B16 to one of the bus lines. The second group 6 may comprise a number of switches equal to at least the number of column lines pertaining to the at least one region of interest, e.g. equal to the number of columns COL04 to COL07. The third group 7 comprises a number of switches equal to the number of buffers B1 to B16, or at least equal to an integer multiple of the number of columns in the region of interest. Typically the number of switches in the third group 7 may be an integer multiple of the number of switches in the second group 6. In particular embodiments of the present invention, the number of switches in the second group 6 may be equal to the number of switches in the third group 7.

In the second mode of operation, also called the "sub-picture mode", all switches 51 to 511 of the first group of switches 5 are opened, so that no direct data connection between the column lines COL01 to COL16 and the corresponding buffers B1 to B16 is provided. The column lines relevant for sub-picture 21, e.g. COL04 to COL07 in the example illustrated, are connectable to the bus lines BL1 to BL4 of an internal analog bus 9 via the switches 60*a*, 60*b*, 60*c*, 60*d* of the second group 6 of switches. In case a plurality of ROIs are provided, column lines of one ROI may be connectable to the bus lines of the internal analog bus 9 via a first subset of the second group 6 of switches, and column lines of another ROI may be connectable to the bus lines of the internal analog bus via a second subset of the second group 6 of switches. In particular embodiments, the first subset 60 of the second group 6 of switches may contain all switches of the second group 6. The switches 60*a* to 60*d* of the first subset 60 can remain closed (hence conductive) while reading the complete sub-picture 21. It is to be noted that the other columns COL01 to COL03 and COL08 to COL16, i.e. the columns not pertaining to any region of interest, are not connected to the analog bus 9 during the second mode of operation.

When a first row of the sub-picture 21 is read, for example in the embodiment illustrated by activating the third row select line RS3, and a first subset of switches 61*a*, 61*b*, 61*c*, 61*d* of the third group of switches 7 is closed, for connecting each of the bus lines BL1 to BL4 of the analog bus 9 to one of the buffers B1 to B4. Then the control block 8 provides the necessary control signals for holding the analog values on the buffers B1 to B4, and the switches 61*a* to 61*d* of the first subset of the first group 7 may be opened again. Then a second row of the sub-picture 21 is read by activating the fourth row select line RS4, and a second subset 62*a*, 62*b*, 62*c*, 62*d* of switches of the third group of switches 7 is closed, for connecting each of the bus lines BL1 to BL4 of the analog bus 9 to one of the buffers B5 to B8, different from the buffers to which the first subset 61*a*, 61*b*, 61*c*, 61*d* of switches connected earlier. Then the control block 8 provides the necessary control signals for storing the analog values on the buffers B5 to B8, while maintaining the analog data on the buffers B1 to B4, and the switches 62*a*, 62*b*, 62*c*, 62*d* of the second subset of the third set of switches 7 may be opened again. In a similar manner the third and fourth row of the sub-picture 21 can be read, and stored in a third and a fourth subset of the buffer array 3, using a third subset 63 of switches of the third group 7 and a fourth subset of switches of the third group 7, while maintaining the already stored values. In this way, all the pixel values of the sub-picture 21 are stored in the buffer array 3, and the analog-to-digital conversion is activated once for digitizing all pixel values of the sub-picture at once. Finally, the digitized data can be readout over the digital bus.

From the above, it can be understood why the switches 51 to 516 of the first set of switches 5 are also called "bypass-switches", as they simply "bypass" the analog bus circuitry 9.

Since the first, the second and the third group of switches 5, 6, 7 are stable (i.e. not actively switching) in the "full-resolution mode" of the image sensor, substantially no switching noise is to be expected in this readout-mode. In order to reduce cross-talk between the bus lines, should this occur, a further set of switches (not shown) may optionally be added for connecting the bus lines BL1 to BL4 to ground in the full-resolution mode. Of course, these switches should be opened in the "sub-picture" mode. A person skilled in the art can take other design considerations into account, such as increased bus-load, especially for the column lines of the sub-picture, (e.g. COL04 to COL07 in the example above). Timing simulation and verification, and if needed, adding extra line buffers or amplifiers, and/or modifying the timing, etc, belongs to the normal design practice of the person skilled in the art.

It should be noted that the block-schematic of FIG. 6 is only an example of a possible implementation of the routing block 10. For example, instead of switches, also tri-state buffers may be used for passing or blocking the analog values from the column lines to the bus lines and/or from the bus lines to the buffers. And for example, a sample-and-hold buffer may be implemented as a switch and a capacitor, etc. Such circuit-optimization, along with the layout, placement and routing of that circuit belongs to the normal design practice of the person skilled in the art of image sensor design.

Although the invention has been illustrated for an image sensor 1 having a pixel array 2 of 16×9 pixels, the invention is not limited thereto. In typical applications such as for example machine vision, digital photography, medical applications and traffic control, the pixel arrays 2 will be much larger. Embodiments of the present invention can be applied to any suitable size of pixel array 2; a few examples being e.g. 80×40 pixels, 320×200 pixels, 640×480 pixels, 1280×1024 pixels, 1920×1080 pixels, 4000×2000 pixels, or any other size.

Although embodiments of the invention have been illustrated for a sub-picture (region of interest) of 4×4=16 pixels, the invention is not limited thereto, and can also be applied to other square or rectangular sub-picture sizes. In fact, the geometry of the sub-picture does not even have to be square, but may also be e.g. triangular, trapezoidal, circular or ellipsoid, or any other suitable shape. For example, if the sub-picture of FIG. 5 were substantially circular (2+4+4+2 pixels), and if the analog bus 9 would still have 4 bus lines BL1 to BL4, then two pixels could be read on Row3 and stored in B1 and B2, four pixels could be read on Row4 and stored in B3 to B6, four pixels could be read on Row5 and stored in B7 to B10, and finally two pixels could be read on Row 6 and stored in B11 and B12, and then the analog-to-digital conversion could take place. Of course, the routing block 10 and control block 8 would have to be adapted accordingly.

Embodiments of the invention include an image sensor 1 having a sub-picture 21 of a fixed or programmable/user-definable size, located on a fixed or programmable/user-definable position, whereby not both the size and location of the sub-picture are fixed. According to embodiments of the present invention, either one or both of the size and location of the sub-picture may be programmable/user-definable. For instance, the first and last row of the sub-picture 21 may be programmable (user definable), while the width of the sub-picture is pre-defined.

Figure 10:
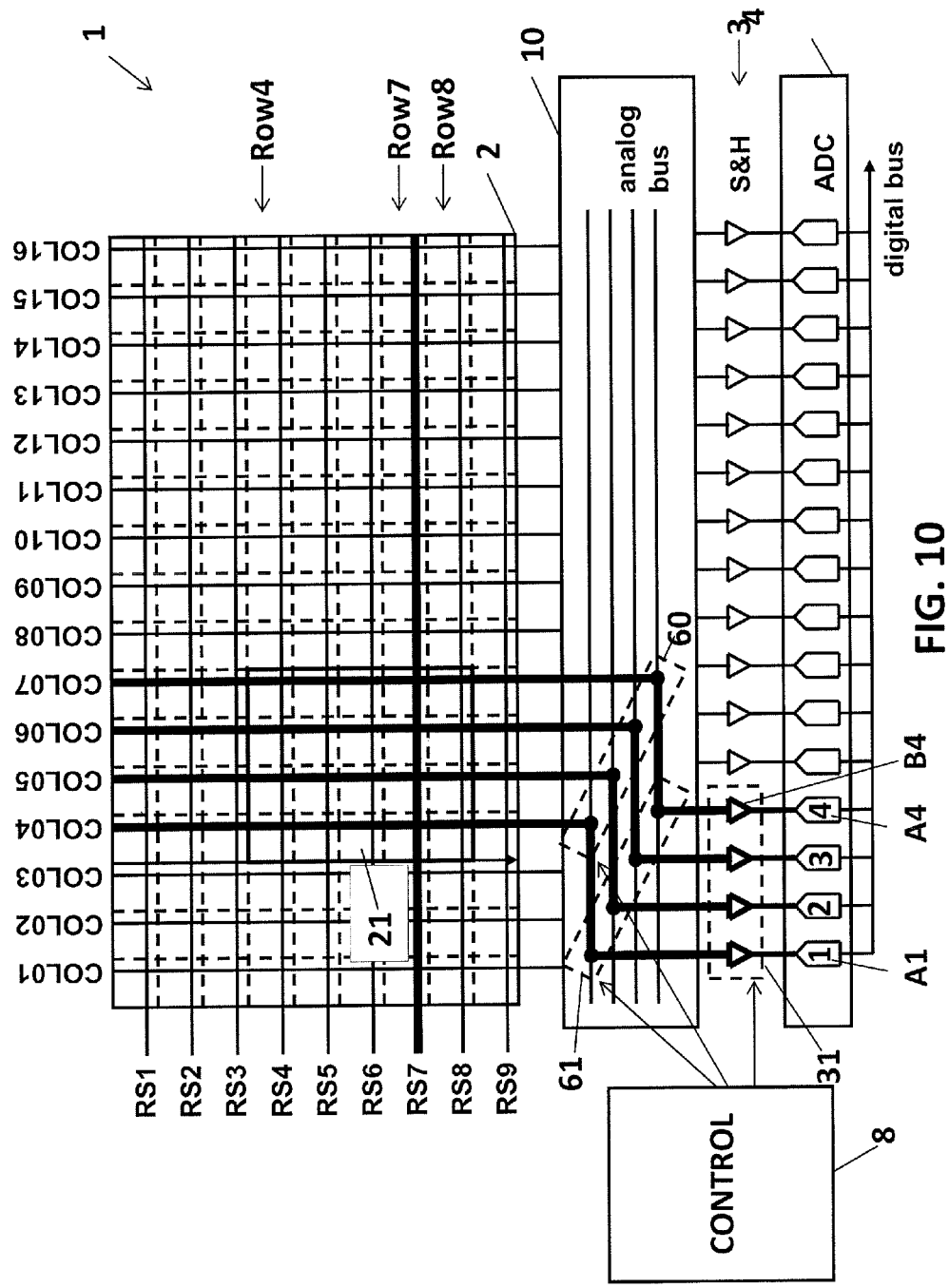
FIG. 10 illustrates the readout of a sub-picture of an image sensor having a user-definable vertical position.

An example of such an image sensor 1 is illustrated in FIG. 10, where the horizontal position of the sub-picture 21 is fixed (the same COL04 to COL07 as before), but where the vertical position is programmable, e.g. by means of a first and second control register for holding the top and bottom row number of the sub-picture 21. In the example of FIG. 10 the top row is the fourth, and the bottom row is the eighth. The same or an analogous routing block 10 and control logic 8 may be used as were described before. Readout of the sub-picture 21 may occur as follows. The image sensor may first read the top row of the sub-picture 21, e.g. in the example illustrated Row4 of the pixel array 2, and store the values of the sub-picture 21 in the buffers B5 to B8 (as in FIG. 7), then read the fifth row Row5 of the pixel array 2, and store the values of the sub-picture 21 in the buffers B9 to B12 (as in FIG. 8), then read the sixth row Row6 of the pixel array 2, and store the values of the sub-picture 21 in the buffers B13 to 816 (as in FIG. 9), then digitize the data in the buffers using the analog-to-digital array 4, and provide the digitized data on the digital bus to e.g. an external processor. In this case, the external circuitry, would discard the values corresponding to the analog-to-digital convertors A1 to A4, since they do not contain sub-picture data, but probably digitized noise (i.e. "dummy data"). Then, the seventh and eighth rows Row7 and Row8 of the pixel array 2 may be read-out, by storing the sub-picture data in the buffers B1 to B4 and B5 to B8 respectively. Then the data in the buffer array 3 may be digitized by the ADC array 4, and provided on the digital bus, and the external circuitry would have to discard the values corresponding to the analog-to-digital convertors A9 to A16. Clearly, the advantage in terms of timing and power consumption is still achieved, since only two ADC-conversion steps are required for reading the sub-picture 21 of FIG. 10, instead of five ADC conversion steps, as needed in the prior art. Optionally, the image sensor 1 may also be able to discard the dummy data internally, and only provide valid sub-picture data on the digital bus. This would probably require some modifications of the digital output circuitry (not shown), but would probably not require changes of the routing block 10 and control block 8.

In particular embodiments of the present invention, the ROI can be user-defined. In such cases, it is easiest if the ROI has fixed dimensions, e.g. for light measurements at different locations of an image, or for autofocus measurements within the image. However, in alternative embodiments, where full flexibility is required, e.g. in machine vision applications, where particular parts of the image for example need to be enlarged, a fully programmable ROI, both in terms of size and in terms of location, may be provided. Even then requirements can be imposed to the ROI, such as that the size of the ROI is a plural of a predefined number of pixels, which allows to select the size of the analog bus also as a plural of the predefined number of pixels.

In an embodiment of the present invention, the number of analog bus lines BL1, BL2, etc of the internal analog bus 9 is equal to the number of pixels on a row of the sub-picture 21, or in case of a non-rectangular sub-picture, equal to the maximum number of pixels on any row of the sub-picture 21 (e.g. four in the example of the circular sub-picture described above). However, this is not absolutely required, because the invention would also work when not all columns of the sub-picture of a single row are read at once. This may become particularly important when the sub-picture 21 has a width of e.g. more than 50 pixels. For illustration purposes only, because an analog bus 9 of four lines is hardly a problem, it would e.g. be possible in the example of FIG. 5 to FIG. 9 described above, to use an analog bus 9 having only two lines. The working could be implemented for example as follows: In a first access of the first line RS3 of the sub-picture 21, COL04 and COL05 would be connected to the analog bus 9, for storing the pixel values in B1 and B2, then RS3 would be asserted again, while COL06 and COL07 are connected to the analog bus, for storing the pixel values in B3 and B4. Then RS4 would be asserted a first time while connecting COL04 and COL05 to the analog bus 9 for storing the data in buffers B5 and B6, etc. Thus it would require two row-accesses to transfer the analog data of each row of the sub-picture 21 to the buffers, thus in total eight row-accesses would be required. Although the switching would be somewhat more complicated, and it would require more time for transferring the data, the benefit of reducing the time and energy by reducing the number of analog-to-digital conversion steps, is still valid, as analog-digital conversion burns usually a major portion of the time and energy required. For a given number of analog-to-digital convertors and sub-picture size and geometry, the person skilled in the art can make a suitable trade-off between design-complexity, space required for the analog bus 9, readout-speed and power consumption.

Figure 11:
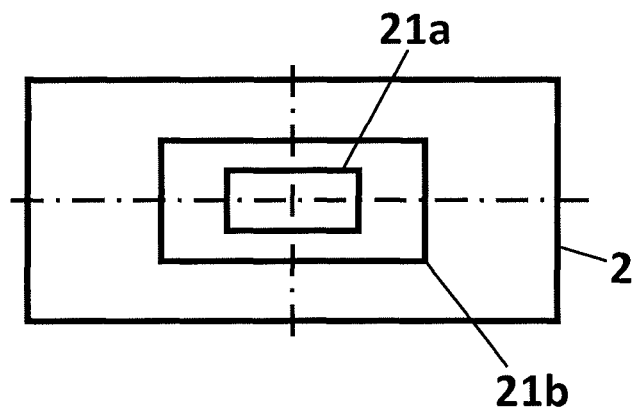
FIG. 11 shows an example of an image sensor with two sub-pictures, both located in the centre of the pixel array.
Figure 12:
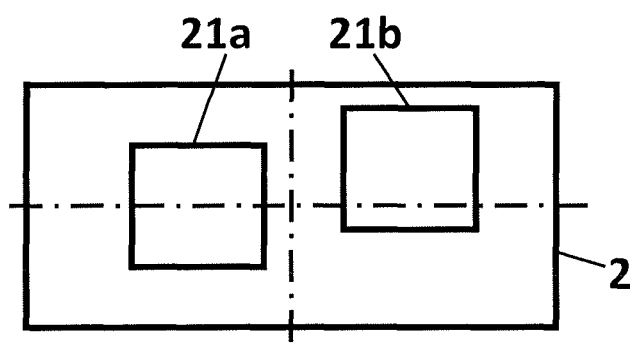
FIG. 12 shows an example of an image sensor with two adjacent sub-pictures.

In embodiments of the present invention, it is also contemplated to provide an image sensor 1 having more than one Region-Of-Interest, for example two or three. Which ROI is actually used, can then be selected, for example via a user input, e.g. via a register. Each of the ROI's has a predetermined or user-definable horizontal and a predetermined or user-definable vertical position, and the hardware, in particular the routing block 10 and the control block 8 may be adapted for supporting each of them. An example may be an image sensor 1 having a pixel array 2 of M×N pixels, and a first (small) ROI 21a of (M/4)×(N/4) pixels, and a second (larger) ROI 21b of (M/2)×(N/2) pixels, where M and N are integer multiples of four, e.g. M=640 and N=480, or M=1920 and N=1080, but other numbers are also possible. The first and second ROI 21a, 21b may overlap, as shown e.g. in FIG. 11, where both sub-pictures 21a, 21b are located in the centre of the pixel array 2. From the description above, it is clear that the first ROI 21a can be read at a higher frame-rate (e.g. 3 times faster) than the second ROI 21b, and the second ROI 21b can be read at a higher frame rate (e.g. 1.5 times faster) than the full-resolution image. In another embodiment, the first and second sub-pictures 21a, 21b may have equal size, but may be adjacent one another, as shown e.g. in FIG. 12. The readout of the first or second ROI in this case would be possible at the same speed and power consumption. Other positions and sizes are also possible. As mentioned before, the horizontal or vertical size of each of these sub-pictures 21a, 21b may be fixed or may be programmable.

Optionally the sub-picture 21 may be located substantially in the middle of the pixel array 2, both vertically and horizontally, e.g. in the middle of the pixel array 2. This may be a very suitable location for a Region-Of-Interest, e.g. in applications for zooming part of the image, or for fast object-tracking (such as e.g. a football). The size of the region-of-interest, hence of the sub-picture, may be defined on-the-fly for instance depending on the content of the image, and/or in function of the number of analog-to-digital convertors available in the image sensor.

In accordance with embodiments of the present invention, once the sub-picture has been read out, it may be analysed by conventional image analysis tools. If results of such analysis reveal that a particular triggering event has occurred, it may result in triggering a particular action to be taken, for instance a full image to be read. Such detected triggering events may for instance be a predetermined lighting condition being met in the analysed sub-picture, a gesture such as for instance a smile being determined in the analysed sub-picture, or another composition parameter being found in the analysed sub-image, which leads to a satisfactory result (satisfactory being related to user expectations and being different from situation to situation, possibly depending on camera settings).

In the examples of FIG. 1 to FIG. 9, the number of pixels of the sub-picture 21, (namely 4×4=16), is equal to the number of analog-to-digital convertors of the image sensor 1 (also 16). Although very beneficial, this is not absolutely required, and the number of pixels of the sub-picture 21 may also be larger or smaller than the number of ADC-convertors. If the number of pixels of the sub-picture 21 is smaller than or equal to the number of ADC-convertors, a single ADC-conversion step suffices for digitizing the entire sub-picture data. If the number of pixels of the sub-picture 21 is larger than the number of ADC convertors, a plurality of conversion steps need to be carried out for converting the complete ROI. As an example only, the number of pixels of the sub-picture 21 may be twice the number of analog-to-digital convertors, in which case half, e.g. an upper half, of the sub-picture 21 can be stored in the buffer array 3 in a first phase as described above, line per line, and then be digitized by a first A/D-conversion-step, and then another half, e.g. the lower half, of the sub-picture 21 can be stored in the buffer array 3 in a second phase as described above, line per line, and then be digitized by a second A/D conversion step. In general, if the number of pixels of the sub-picture 21 is an integer N times the number of analog-to-digital convertors, then N analog-to-digital conversion steps are required for digitizing the sub-picture 21. As long as N is larger than 1, this is advantageous over the prior art.

Referring to FIG. 6, it is to be noted that a single control signal (not shown) can be used to open resp. close all the switches 51 to 516 of the first group 5, and the inverted signal thereof could be used for closing resp. opening all the switches of the second group 6. The control signal would depend on the mode: full-resolution or sub-picture mode. The other switches and buffers may also be controlled in groups, e.g. the switches 61a to 61d of the first subset 61 of the third group 7 of switches can all be opened resp. closed together, and the same applies for the other subsets of switches. Thus, if the analog bus 9 is wide, the number of control signals can be kept limited.

The parallel placement of the ADC-convertors, and the use of fast ADC-convertor circuits (such as e.g., but not limited thereto, single-slope, successive approximation or sigma-delta ADCs) allow the image sensor to achieve a high frame rate (e.g. 10 or 15 or 24 or 30 or even 50 or 60 frames per second, or even more).

The main advantage of the image sensor 1 according to embodiments of the present invention as described above is the ability to readout a "Region Of Interest" (a sub-picture) at an increased speed (e.g. reduced time, higher frame rate) and/or at a reduced power consumption. This is made possible by efficient usage, e.g. limited usage of the A/D-convertor array 4. Any application using an image sensor where speed and/or power consumption is important, may benefit from this application.

A first example of such applications is: machine vision, where windowing may be commonly used to speed up the inspection of goods. Instead of reading and processing a complete two-dimensional array, the readout of a ROI or even multiple ROI's will increase the through-put time of the inspection equipment.

Another example is: digital photography, which may benefit from the method described above in several ways. Examples are measurement of the light intensity. Only a small area of the sensor may be used to measure the amount of light that is falling on the sensor. This measurement needs to be done quickly and with a low amount of power. Another example is the readout of "focus-pixels", e.g. for determining the position of a focus lens. Although focus pixels are typically located on just a few lines and/or columns, this may be considered as an ROI as well. Another example in digital photography is digital zoom, whereby only a sub-picture is to be read, and the resulting data may be enlarged by software up-scaling.

Another example is medical applications: monitoring the radiation dose used in diagnostic and therapeutic X-ray treatments may be of crucial importance. This can be done by means of a (non-destructive) readout of an ROI.

Another example is Traffic control: in case the information of the license plate is important, there is no need to read the complete sensor, but only the area corresponding to the information relating to the license plate.

Yet another example is security, where only particular people or objects in the image need to be followed.

FIRST NUMERICAL EXAMPLE

In order to get a feeling of the benefit obtained, a hypothetical prior art image sensor with 4000×2000 pixels is assumed, operating at a speed of 10 frames/s and consuming 1.0 W. It is further assumed that 90% of the power is consumed by a 12-bit ADC converter block 4.

Since the prior image sensor performs one ADC operation for each line, reading a single line consumes 1 W/(2000×10) =50 µW/s, and the time required for processing one line is 1 s/(2000×10)=50 µs. To keep the calculation simple, it is further assumed that 25% of the time (i.e. 12.5 µs/line) is spent on reading the analog value from the pixels, and storing them in the buffer array 3, and 75% of the time (i.e. 37.5 µs/activation) is spent on the ADC conversion (i.e. the digitization). The time for reading out the digital bus is not incorporated, because this may be done in parallel with the reading and storage of next data.

It is now considered what would be the time and power needed to read a sub-picture of 100×100 pixels in a prior art image sensor, and in an image sensor of the present invention.

A prior art image sensor (having 4000 ADC convertors) would need to read 100 lines, thus the time required is 100×50 µs=5000 µs, and would need to activate the ADC 100 times, thus the power consumption would be: 100×50 µW=5 mW.

An image sensor according to embodiments of the present invention with a routing block 4 comprising an analog bus 9 of 100 lines, and also having 4000 analog-to-digital convertors, would require only three activations of the column-level ADC (40 lines+40 lines+20 lines). The total readout time is then: 100×12.5 µs+3×37.5 µs=1362.5 µs, which is almost a factor of four faster than with the prior art image sensor, meaning that the ROI could be read at 36 frames per second. The power consumption would be: 100×5 µW+3×45 µW=635 µW, being almost an order of magnitude smaller.

SECOND NUMERICAL EXAMPLE

As a second example, the same image sensor having 4000× 2000 pixels is assumed, but the ROI now consists of two complete columns (thus 2000×2 pixels), for instance for auto-focusing purposes. With the prior art image sensor, readout of the ROI would correspond to readout of one complete frame: this would take 100 ms and consume 100 mW in the example given above.

With an image sensor according to embodiments of the present invention, e.g. having a routing block 4 comprising an analog bus of 100 lines, and having 4000 analog-to-digital convertors, the time required is: 2000×12.5 µs+1×37.5 µs=25 ms, and the power consumption will be 2000×5 µW+1×45 µW=10 mW.

The invention claimed is:

1. An image sensor comprising:
    a pixel array comprising a plurality of image pixels logically organized in rows and columns, the outputs of the pixels of each column of the pixel array being connected to a corresponding column line;
    a buffer array comprising a plurality of buffers for each temporarily storing an analog value present on a column line;
    an analog-to-digital convertor array comprising a plurality of analog-to-digital convertors operably connected to the buffers for converting the analog values stored in the buffers into digital values;
    characterised in that
    the pixel array comprises a sub-picture having a number of pixels larger than, or equal to, or less than the number of analog-to-digital convertors;
    the image sensor further comprises a routing block connectable between the column lines and the buffer inputs, the routing block comprising a group of connection means for selectively operatively connecting at least one column line to at least two buffers;
    the routing block being configurable in a full-resolution mode for routing each of the pixels of a selected row of the pixel-array to one of the buffers by interconnecting each of the column lines with its corresponding buffer;
    the routing block being configurable in a sub-picture mode for routing the pixels of at least a first and a second row of the sub-picture to the buffers;
    the image sensor being adapted for simultaneously digitizing the pixel values of the at least first and second row of the sub-picture by a single activation of the analog to digital converter array during the sub-picture mode;
    a control circuit for controlling the routing block for routing the pixel values on the column lines to a subset of the buffer array.

2. The image sensor according to claim 1,
    wherein the sub-picture has a number of pixels equal to, or less than the number of analog-to-digital convertors, and
    wherein the routing block is configurable in a sub-picture mode for routing all the pixels of the sub-picture to the buffers; and
    wherein the image sensor is adapted for simultaneously digitizing the pixel values of the entire sub-picture by a single activation of the analog to digital converter array.

3. The image sensor according to claim 1, wherein:
    the routing block further comprises an analog bus having a plurality of bus lines;
    and wherein the group of connection means comprises a first subset of connection means for operatively connecting the column lines of the sub-picture to the analog bus lines of the analog bus, and at least a second and a third subset of connection means for operatively connecting the analog bus lines to the at least first and second subsets of the buffer array.

4. The image sensor according to claim 3, wherein the width of the sub-picture is an integer multiple of the number of analog bus lines.

5. The image sensor according to claim 4, wherein the width of the sub-picture is equal to the number of analog bus lines.

6. The image sensor according to claim 1, wherein the total number of pixels of the sub-picture is an integer multiple of the number of analogy-to-digital convertors or wherein the total number of pixels of the sub-picture is equal to the number of analog-to-digital convertors.

7. The image sensor according to claim 1, wherein the sub-picture is rectangular.

8. The image sensor according to claim 1, wherein the sub-picture has a programmable vertical position and/or a programmable horizontal position.

9. The image sensor according to claim 1, wherein the sub-picture has a predefined horizontal position or a predefined vertical position.

10. The image sensor according to claim 1, wherein the sub-picture has a vertical symmetry-axis, which is located substantially in the middle of the pixel array.

11. The image sensor according to claim 1, wherein the image sensor is a CMOS image sensor, and the group of connection means comprises NMOS transistors.

12. Method for reading the image data of a sub-picture of an image sensor according to claim 1, the method comprising:
    routing at least image data of the pixels of a first row of the sub-picture to a first subset of the buffers, and image data of the pixels of a second row of the sub-picture to a second subset of the buffers, and
    thereafter, during the sub-picture mode, activating the analog-to-digital convertor array for performing simultaneous analog-to-digital conversion of the pixel values of the at least first and second rows of the sub-picture.

13. The method according to claim 12, wherein routing at least image data of pixels of a row of the sub-picture to the buffers includes routing the image data from a column to an analog bus line, and from the analog bus line to a buffer.

14. The method according to claim 12, wherein obtaining non-predefined location specifications about the sub-picture to be read includes receiving location specifications about the sub-picture from a processor having analysed an image on the array of pixels.

15. The method according to claim 12, wherein obtaining non-predefined location specifications about the sub-picture to be read includes receiving user defined location specifications about the sub-picture to be read.

16. The method according to claim 15, wherein receiving user defined location specifications comprises a user selecting the sub-picture to be read.

17. The method according to claim 12, wherein obtaining non-predefined location specifications about the sub-picture to be read comprises receiving information about position and/or size of the sub-picture.

18. The method according claim 12, wherein the sub-picture consists of a plurality of auto-focus pixels.

19. The method according to claim 12, further comprising: obtaining non-predefined location specifications about the sub-picture to be read, and wherein the routing of the image data is based on the obtained location specification.

* * * * *